United States Patent [19]

Inada et al.

[11] Patent Number: 4,985,618

[45] Date of Patent: Jan. 15, 1991

[54] PARALLEL IMAGE PROCESSING SYSTEM

[75] Inventors: Toshio Inada; Aki Ueda; Hironobu Mifune; Yukio Ogura, all of Yokohama, Japan

[73] Assignee: Nicoh Company, Ltd., Japan

[21] Appl. No.: 367,756

[22] Filed: Jun. 13, 1989

[30] Foreign Application Priority Data

| Jun. 16, 1988 | [JP] | Japan | 63-148816 |
| Jun. 16, 1988 | [JP] | Japan | 63-148817 |
| Jul. 5, 1988 | [JP] | Japan | 63-167112 |

[51] Int. Cl.⁵ .......................................... H01J 40/14
[52] U.S. Cl. .................................... 250/208.1; 302/54
[58] Field of Search ............ 250/561, 208.1; 901/47; 358/105; 382/54, 22

[56] References Cited

U.S. PATENT DOCUMENTS

| 4,700,229 | 10/1987 | Herrmann et al. | 382/54 |
| 4,783,833 | 11/1988 | Kawabata et al. | 382/54 |
| 4,783,840 | 11/1988 | Song | 382/54 |
| 4,791,678 | 12/1988 | Iwase et al. | 382/54 |

Primary Examiner—David C. Nelms
Assistant Examiner—Que Tan Le
Attorney, Agent, or Firm—Mason, Fenwick & Lawrence

[57] ABSTRACT

A parallel image processing system comprises an image detection array of photodector elements, edge detection circuit including a number of edge detection elements for producing an output signal indicating detection of edge of the input image, and movement detection circuit including a number of movement detection elements each being supplied with output signals from a first group of the edge detection elements along a first signal path as an excitement signal and further from a second group of the edge detection elements along a second signal path as an inhibitory signal, for producing a movement detection signal indicating movement of the input image on the basis of comparison of the excitement signal and the inhibitory signal.

12 Claims, 14 Drawing Sheets

FIG.1
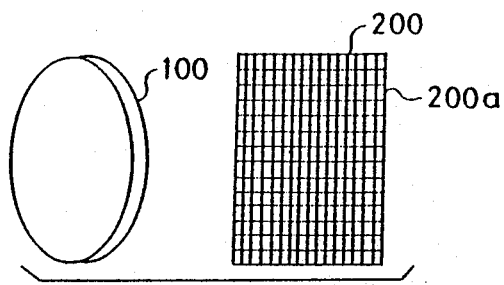
FIG.2(A)
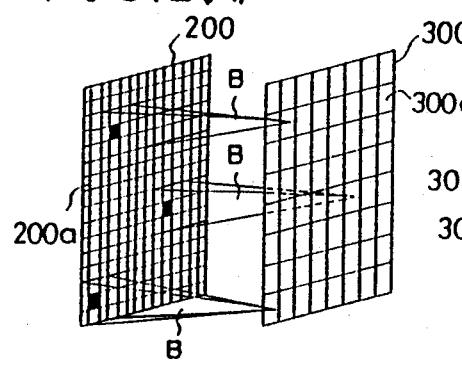
FIG.2(C)
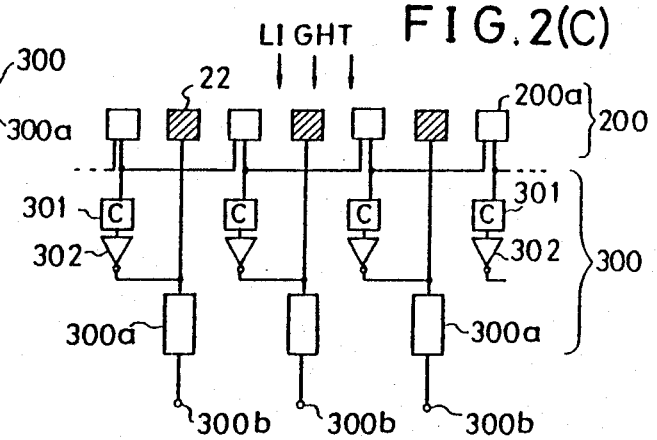
FIG.2(B)
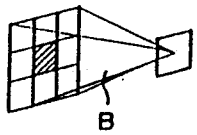
FIG.3(A)
FIG.3(B)
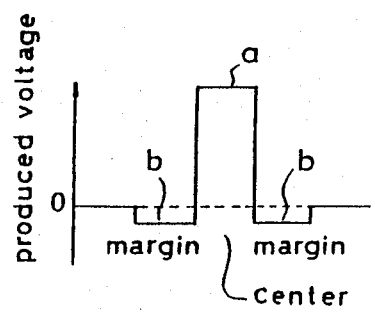

FIG. 7(A)
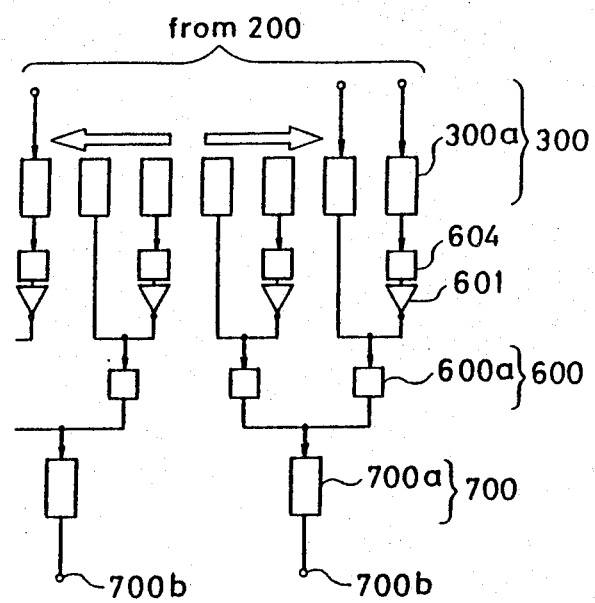
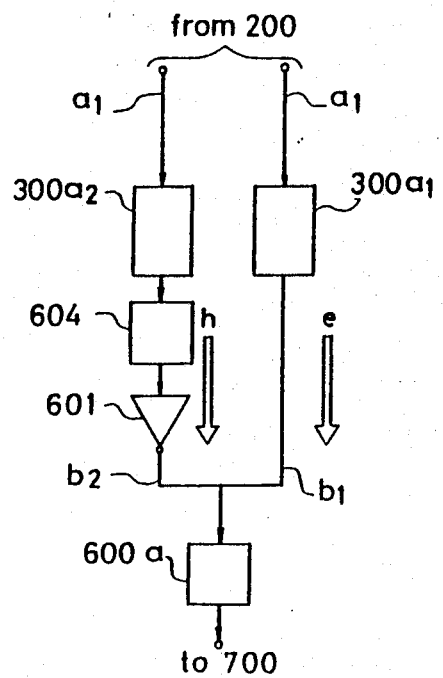
FIG. 7(B)
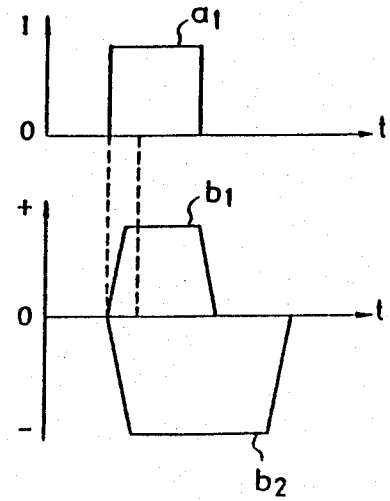
FIG. 7(C)

FIG. 8(A)
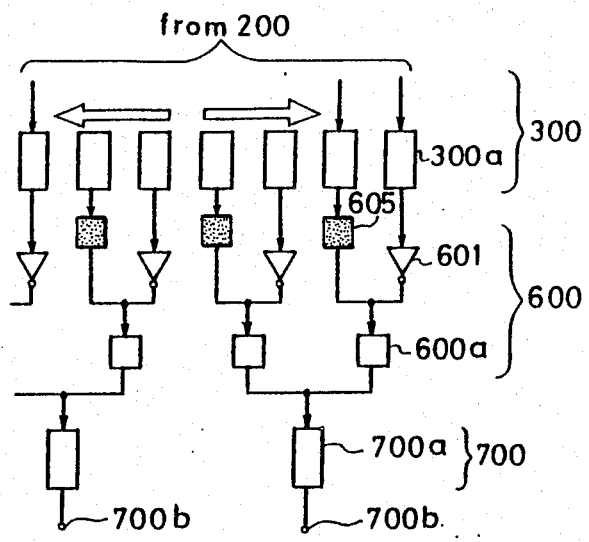
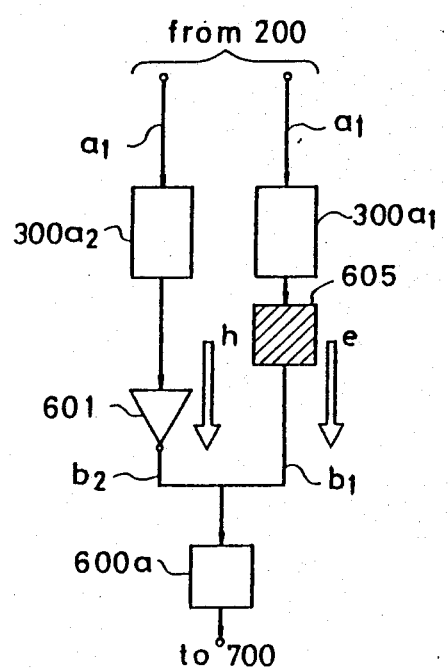
FIG. 8(B)
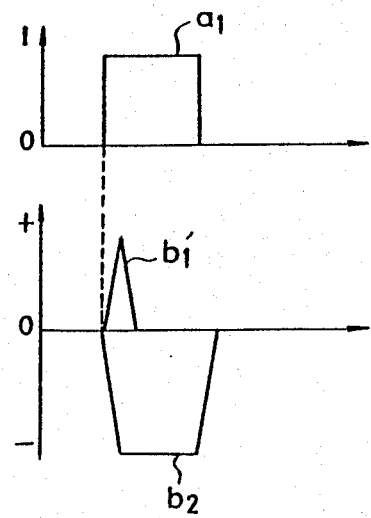
FIG. 8(C)

FIG. 9(A)
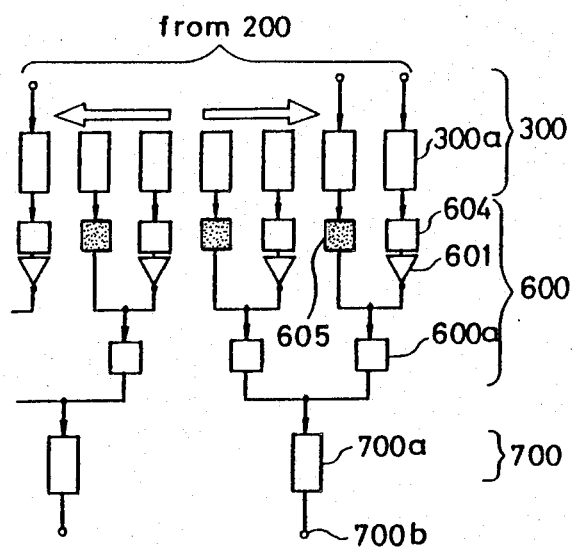
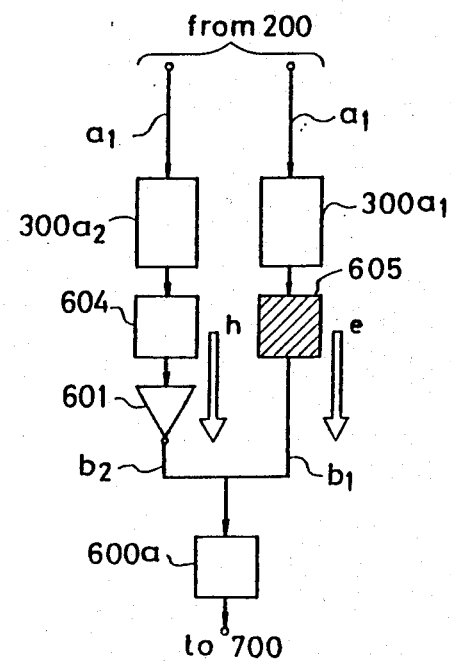
FIG. 9(B)
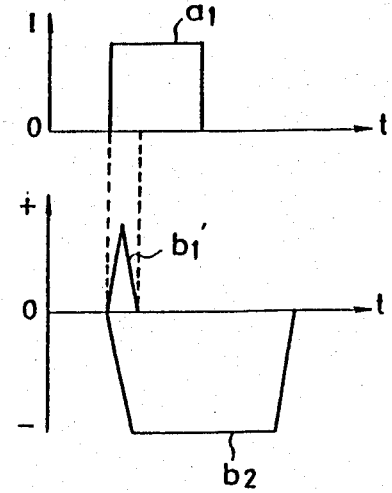
FIG. 9(C)

PARALLEL IMAGE PROCESSING SYSTEM

BACKGROUND OF THE INVENTION

The present invention generally relates to parallel image processing system and more particularly to a recognition of image using such a parallel image processing system.

Conventionally, there are various systems proposed for detecting contrasts, isolated points, direction of lines, end points and the like by simulating the function of the optic nerve system of a biological body. Among others, Japanese Patent Publication No. 50-34901 and Japanese Patent Publication No. 53-23987 describe a parallel image processing system performing such a function. However, no system is reported so far which can detect the movement of object by simulating the optical nerve system of biological body.

In a conventional image input system used in a robot and the like, an input image is sampled after picturing by a television camera. The image thus sampled is then digitized and processed time sequentially by a digital computer. Such a conventional procedure has a problem in that it takes a substantial time for sampling, digitization, feature extraction, and the like. In order to solve this problem, there is proposed a use of two dimensional array of photodetectors for receiving the input image. In this system, feature extraction is performed by combining output signals of the various photodetectors. In such a system, however, there is a problem in that electrical wiring for connection of the photodetectors becomes complex.

In the aforementioned conventional image processing system for detecting a two dimensional image based on digital processing, the detection of slope of a line image, which is essential for recognition of the image, is performed by a number of image processing steps such as preliminary processing, feature extraction, pattern matching and the like. Such a processing is performed time sequentially on the basis of two dimensional image data stored in an image memory. Thus, the procedure is time consuming and needs a large memory space.

SUMMARY OF THE INVENTION

Accordingly, it is a general object of the present invention to provide a novel and useful parallel image processing system wherein the aforementioned problems are eliminated.

Another and more specific object of the present invention is to provide a parallel image processing system based on the simulation of the optic nerve system of biological body wherein detection of moving body in a view field is possible.

Another object of the present invention is to provide an parallel image processing system capable of detecting direction of movement of a body.

Another object of the present invention is to provide an image processing system comprising: a layer of photodetecting elements arranged in a two dimensional array for receiving an input image; threshold elements arranged in a two dimensional array such that each of the threshold elements in the array is supplied with output signals from a plurality of photoelectric cells with weights determined for respective photoelectric elements, for producing an edge image signal representing an edge image of the input image as a sum of the weighted output signals; wherein there is provided another two dimensional array of detection elements each connected to a plurality of threshold elements which in turn cooperates with a row of photodetecting elements such that each detection element is supplied with the edge image signals from a group of threshold elements cooperating with a group of photodetecting elements at one side of the row as an excitement signal and further supplied with the edge image signals from another group of the threshold elements cooperating with the group of photodetecting elements at the other side of the row as an inhibitory signal. According to the present invention, movement of the body or object causing change in the input image is detected by the detecting element by comparing the excitement signal from the first group of the threshold elements and the inhibitory signal from the second group of the threshold elements. In the present invention, the direction of movement can also be discriminated by providing delay circuit in a signal path of the inhibitory signal. Further, by providing a differential circuit in the signal path of the excitement signal, erroneous detection of movement of a stationary body is prevented.

Another object of the present invention is to provide an image processing system wherein slope of a line image inputted thereto is detected.

Another object of the present invention is to provide an image processing system, comprising: a lens for focusing an input image of a body; a photodetector array for detecting the input image; and optical means interposed between the lens and the photodetector array for selectively passing a part of the input image having a particular slope to said photodetector array. According to the present invention, a real time detecting of slope of a line image can be performed with a simple construction.

Another object of the present invention is to provide an image processing system comprising: a lens for focusing an input image of a body; a photodetector array for detecting the input image; and a weighting circuit for applying predetermined weights to output signals of the photodetector array according to predetermined linear patterns having respective slopes. According to the present invention, the recognition of the slope of the input image can be performed without using optical system interposed between the lens and the photodetector array.

Other objects and further features of the present invention will become apparent from the following detailed description when read in conjunction with attached drawings.

BRIEF DESCRIPTION OF THE DRAWINGS

FIG. 1 is a diagram showing a part of optical system of the parallel image processing system of the present invention;

FIGS. 2(A)-(C) show a first embodiment of the parallel image processing system of the present invention for a part used for detection of edge of an input image;

FIGS. 3(A) and (B) are diagrams respectively showing an arrangement of photodetector cell and an output waveform of the photodetector cell used in the system of FIGS. 2(A)-(C);

FIGS. 7(A)-(C) are diagrams showing a second embodiment of the parallel image processing system of the present invention for a part used for detection of direction of movement of a body;

FIGS. 8(A)-(C) are diagrams showing a third embodiment of the parallel image processing system of the present invention;

FIGS. 9(A)-(C) are diagrams showing a fourth embodiment of the parallel image processing system of the present invention;

DETAILED DESCRIPTION

Figure 4:
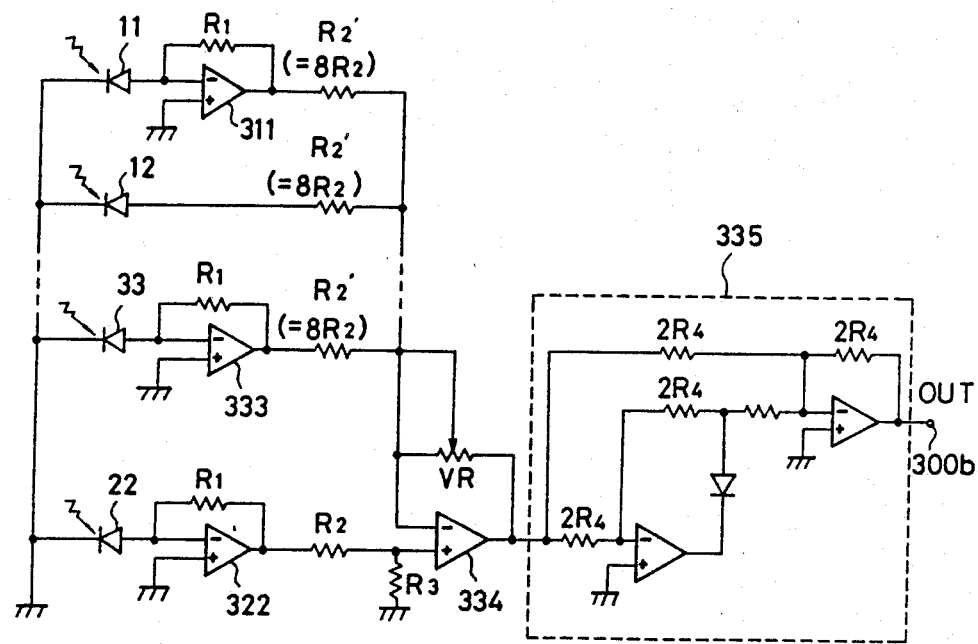
FIG. 4 is a circuit diagram showing an actual construction of circuit shown in FIG. 2(C)

First, a parallel image processing system according to a first embodiment of the present invention for detecting movement of a body will be described with reference to FIG. 1. Referring to the drawing, there is shown a photoelectric cell array 200 comprising a number of photoelectric cells 200a arranged in two dimensional array. The cell array 200 is disposed at the focal plane of a lens 100 and an input image is focused on the cell array 200. Responsive thereto, each of the photoelectric cells 200a produces an electrical signal proportional to the intensity of light which carries the input image. It should be noted that the cells 200a in the cell array 200 are independent from each other.

FIGS. 2(A)-(C) show a construction of an edge detection part 300 of the image processing system of the present invention. The part 300 comprises a two dimensional array of threshold detection devices 300a having a threshold response characteristic responding only to an input signal having a level which is larger than a predetermined level. Each of the devices 300a is connected to a plurality of photodetector cells 200a in the cell array 200 as shown in FIG. 2(A) for receiving output electrical signals. In the illustrated example, one threshold detection device 300a receives the output signal of nine photoelectric cells in the photoelectric cell array 200 as illustrated in FIG. 2(B). Further, the threshold detection device 300a produces an output signal which is a function of a weighted sum of the input signal supplied thereto as will be described. It should be noted that the device 300a is not necessarily be arranged in array in the actual space. Thus, the term "array" of the devices 300a in the edge detection part 300 means that each of the devices 300a is provided in correspondence to the photodetector cells 200a in the cell array 200 as illustrated in FIG. 2(A).

FIG. 3(A) is an enlarged view of a part of the photoelectric cell array 200 including nine (3×3) photoelectric cells 200a shown in FIG. 3(A). The nine photoelectric cells are numbered as 11, 12, 13, 21, 22, 23, 31, 32, 33. In the example of FIG. 3(A), the cell 22 is chosen as the central cell of the nine cell array and other cells surround the cell 22. The central cell 22 supplies a positive polarity signal corresponding to the excitation of a biological nerve cell as shown in a waveform a in FIG. 3(B) to a corresponding threshold detection device 300a in the edge detection part 300 responsive to irradiation by light while the other photoelectric cells surrounding the central cell 22 supply negative polarity signals as shown in a waveform b in FIG. 3(B) corresponding to the inhibitory response of the nerve cell to the same threshold detection device 300a. On the basis of these positive and negative polarity signals, the edge detection part 300 shown in FIG. 2(C) detects the edge of the image as will be described.

Referring to FIG. 27(C) the photoelectric cell 22 at the center of the nine cell array is connected to one of the threshold detection devices 300a to be described later directly and the other cells in the array are connected to the device 300a via a coefficient multiplier 301 and an inverter 302. Responsive to the irradiation of the photoelectric cell array 200, the threshold device 300a at a line i and a column j receives an input signal $N'_{ij}$ which is a weighted sum of the output signals of the nine photoelectric cells 200a defined according to a relation:

$$N'_{ij} = U'_{11} \cdot C_{11} + U'_{12}C_{12} + U'_{22} \cdot C_{22} + \ldots U'_{33} \cdot C_{33}$$

in which $U'_{11}$–$U'_{33}$ represent output signals supplied from the nine photoelectric cells 11–33 shown in FIG. 3(A) and $C_{11}$–$C_{33}$ represent weights to be applied to the output signals $U'_{11}$–$U'_{33}$, respectively. Here, it is assumed that there holds a relation between the coefficients that:

$$C_{11} = C_{12} = C_{13} = C_{21} = C_{23} = C_{31} = C_{32} = C_{33} = Ch < 0;$$
$$C_{22} = Ce > 0; \quad (1)$$

and $$|8Ch| = |Ce| \quad (2).$$

Responsive thereto, the threshold detection device 300a produces an output signal $U_{ij}$ defined as follows:

$$U_{ij} = |(1+e)/(1-h) - 1| = |(e-h)/(1+h)| \quad (3)$$

where
$e = U'_{22} \cdot C_{22}$ and $$h = U'_{11}.C_{11} + U'_{12}.C_{12} + U'_{13}.C_{23} + U'_{21}.C_{21} + U'_{23}.C_{23} + U'_{31}.C_{31} + U'^{32}.C_{32} + U'_{33}.C_{33}.$$

The threshold detection device $300a$ constructed as such produces the output $U_{ij}$ only when there is an edge of image in the region of the nine photoelectric cells 11–33 and the ratio of intensity of the light that is fallen on the photoelectric cell 22 to the intensity of light fallen on other photoelectric cells is deviated from a ratio of 1:8 as a result of existence of the edge of the image. In other words, the threshold detection device $300a$ thus constructed detects the edge of the input image by a spatial differentiation.

FIG. 4 shows a circuit diagram of an actual circuit realizing the edge detection part 300 shown in FIG. 2(C) in the block diagram. Referring to FIG. 4, the photodiodes 11–33 produce output signals which are amplified by respective amplifiers 311, 312, ..., 333 as the output signals $U'_{11}$, $U'_{12}$, ..., $U'_{33}$. These output signals, except for the signal $U'_{22}$ from the photodetector 22 at the center of the photodetector array, are passed through a resistor having a resistance of $R2'$ which is eight times larger than the resistance R2 for the signal $U'_{22}$ and are supplied to an inverted input terminal of an operational amplifier 334. As a result, the output signals of the photodetectors 11–33 except for the photodetector 22 is applied with the weights $C_{11}$, $C_{12}$, ..., $C_{33}$. At the same time, the output signal $U'_{22}$ of the photodetector 22 is applied with the weight $C_{22}$ which is eight times larger in magnitude than the other weights $C_{11}$, $C_{12}$, ... for other photodetectors. Responsive to the input signals from the photodetectors 11–33, the amplifier 334 produces an output signal which agrees with the value of $(e-h)/(1+h)$ by adjusting the gain by a potentiometer VR. The output signal of the amplifier 334 is then passed through a known absolute value circuit 335 and the output signal $U_{ij}$ defined in Eq. (3) is obtained at an output terminal $300b$ of the edge detection part 300. As the construction of the circuit 335 is known, further description for the circuit will be omitted.

Figure 5A:
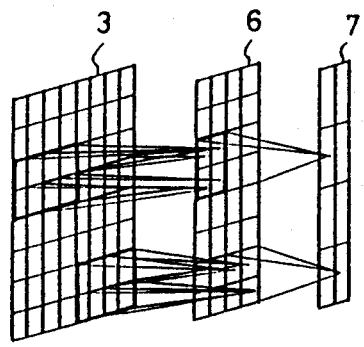
FIGS. 5(A)-(D) are diagrams showing a first embodiment of the parallel image processing system of the present invention for a part used for detection of movement of a body.

Next, a moving object detection part 600 for detection of moving object will be described with reference to FIGS. 5(A)–(D). Referring to FIG. 5(A) at first, the moving object detection part 600 comprises a number of threshold detection devices $600a$ arranged in correspondence to the edge detection part 300. Thus, each of the devices $600a$ in the part 600 is connected via an output terminal $300b$ of the edge detection part to two threshold devices $300a$ each of which in turn corresponds to a pair of photodetector cells $200a$ aligned one-dimensionally in a row in the photodetector array 200. Again, it should be noted that the devices $600a$ forming the part 600 does not necessarily be arranged in the actual row and column formation in the actual space.

Figure 5B:
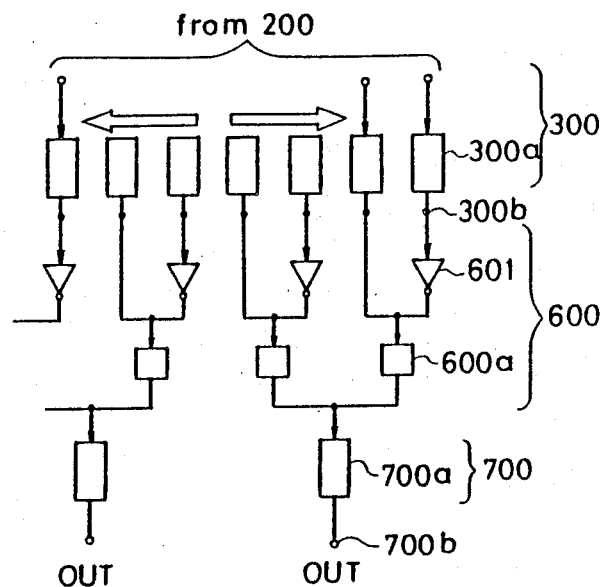

FIG. 5(B) shows the construction of the moving body detection part 600. Referring to FIG. 5(B), one of the threshold detection devices $300a$ directly supplies an output to the threshold detection device $600a$ in the part 600 as the excitation signal while the output of the other of the threshold detection devices $300a$ is supplied to the device $600a$ after passing through an inverter 601 as the inhibitory signal.

Figure 5C:
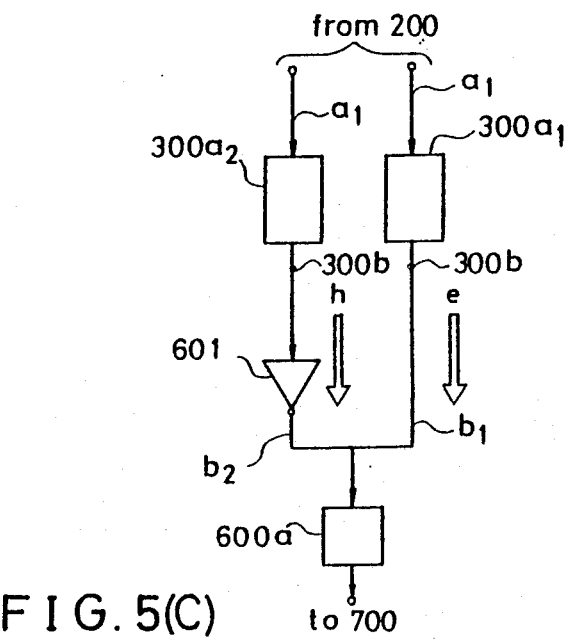
Figure 5D:
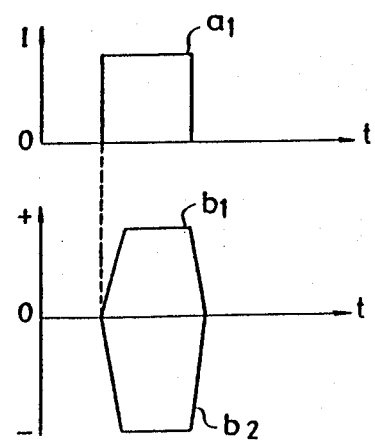

The input/output characteristic of the threshold detection device $600a$ in the moving object detection part 600 is as follows. Referring to FIG. 5(C) showing an essential part of FIG. 5(B), the device $600a$ receives an input signal from a first threshold detection device $300a_1$ via an excitation signal path e and another input signal from a second threshold detection device $300a_2$ disposed adjacent to the device $300a_1$ via an inhibitory signal path h. In the signal path e, the output signal of the device $300a_1$ supplied from the terminal $300b$ is applied with a positive weight. On the other hand, the output signal of the device $300a_2$ is applied with a negative weight in the signal path h by passing through the inverter 601. Thus, the threshold detection device $600a$ of the moving body detecting part 600 receives both an excitation signal and an inhibitory signal similarly to the case of the nerve system of biological body. Further, the device $600a$ is constructed such that it responds only when one of the path e and the path h is transmitting the output signal of the threshold detection devices $300a$ as will be described later in detail FIG. 5(D) explains the time response characteristic of the excitation signal in the signal path e and the inhibitory signal in the signal path h. In FIG. 5(D), the output signal of the threshold detection device $300a$ is shown by a waveform $a_1$. In the drawing, there is also shown an excitation signal $b_1$ in the signal path e and an inhibitory signal $b_2$ in the signal path h produced responsive to the signal $a_1$. As can be seen in the drawing, the excitation signal $b_1$ and the inhibitory signal $b_2$ are produced responsive to the output signal $a_1$ of the device $300a$ with respective transient characteristics of the signal path e and the signal path h. The threshold detection device $600a$ in the part 600 supplied with the signals $b_1$ and $b_2$ then produces an output signal according to a function which is defined by a weighted sum of the signals $b_1$ and $b_2$.

As a rule, the device $600a$ produces output only when the excitement signal $b_1$ is supplied. In other words, the device $600a$ does not produce output when both of the signal $b_1$ and the signal $b_2$ are applied at the same time or when the signal $b_2$ alone is applied. Thus, when there is a movement in the body, the output signal $a_1$ of the threshold detection device $300a$ indicating the edge of the image in the photoelectric array 200 changes with time. As the groups of photodetector cells $200a$ cooperating with the threshold detection devices $300a_1$ and $300a_2$ which in turn cooperate with one of the threshold detection devices $600a$ in the part 600 is arranged in a one-dimensional row, such a movement of the body causes passing-by of the edge of image first in the photodetector group cooperating with the device $300a_2$ and next in the photodetector group cooperating with the device $300a_1$ or vice versa. In the former case, the output signal $b_1$ first appears in the signal path e and then the output signal $b_2$ appears in the signal path h. In correspondence thereto, the device $600a$ first produces an output signal indicating the movement of the body. This output signal is soon suppressed upon detection of the edge of the image by the threshold detection device $300a_2$. In the latter case, the order is reversed and the output signal is produced lastly when the device $300a_1$ alone produces the output signal. Further, when the image is stationary and the edge of the image is not detected by any of the threshold detection devices $300a_1$ and $300a_2$, there is no output signal produced by the device $600a$. Thus, the image processing system detects not only the edge of the input image of body but also the movement of the body.

Figure 6A:
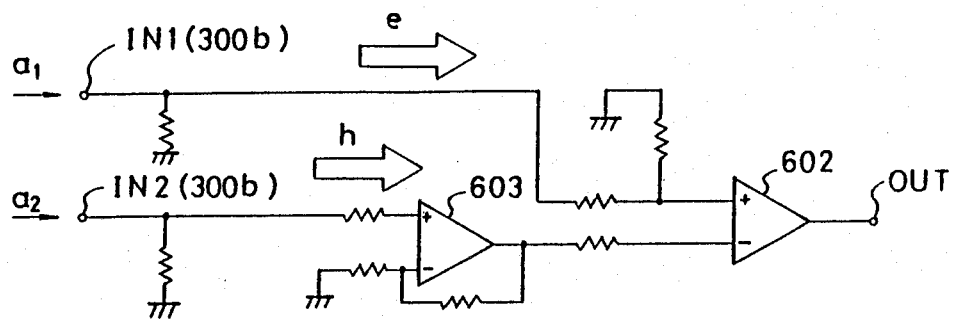
FIGS. 6(A) and (B) are circuit diagrams showing an actual construction of circuit shown in FIGS. 5(C) and 7(B)

FIG. 6(A) shows a circuit diagram of the circuit shown in FIG. 5(C) in a form of block diagram. Referring to the drawing, the output signal $a_1$ of the threshold detection device $300a_1$ applied to an input terminal IN1 which is common with the output terminal $300b$ is supplied to a non-inverting input terminal of a differential amplifier 602 along the excitement path e. Further, the output signal a₂ of the threshold detection device 300a₂ applied to an input terminal IN2 also common with the terminal 300b is supplied to an inverting input terminal of the differential amplifier 602 along the inhibitory path h after amplification in an operational amplifier 603 such that the amplitude of the signal in the path h is at least equal to or larger than that in the path e. As a result, the differential amplifier 602 produces an output signal only when there is the signal a₁ in the excitement path e.

It should be noted that the same detection of the movement of body can also be performed by constructing the threshold detection device 600a such that the device produces the output only when there is a signal in the inhibitory path h. As such a modification is obvious, further description will be omitted.

Next a second embodiment of the image processing system of the present invention for detecting direction of movement of a body will be described. In the first embodiment, it can be easily understood that the system has a problem in that: (a) the direction of movement of the body cannot be detected; and (b) the threshold detection device 600a produces the output signal continuously when there is a stationary body such that the threshold detection device 300a₁ detects the edge of the body while the other device 300a₂ is not detecting the edge.

In order to solve the problem (a), the second embodiment of the image processing system of the present invention uses a delay circuit 604 provided in the signal path h between the threshold detection device 300a and the inverter 601 as shown in FIGS. 7(A) and (B) in which FIG. 7(B) shows only the essential part of FIG. 7(A). In this embodiment, the signal b₂ in the signal path h starts rising in the negative direction after a delay time—has elapsed from the moment the signal a₁ has arisen as shown in FIG. 7(C). Further, the delay circuit 604 is constructed such that the duration of the signal b₂ exceeds the duration of the signal b₁ as shown in FIG. 7(C). For this purpose, an integration circuit RC is used for the delay circuit 604 as shown in FIG. 6(B).

Figure 6B:
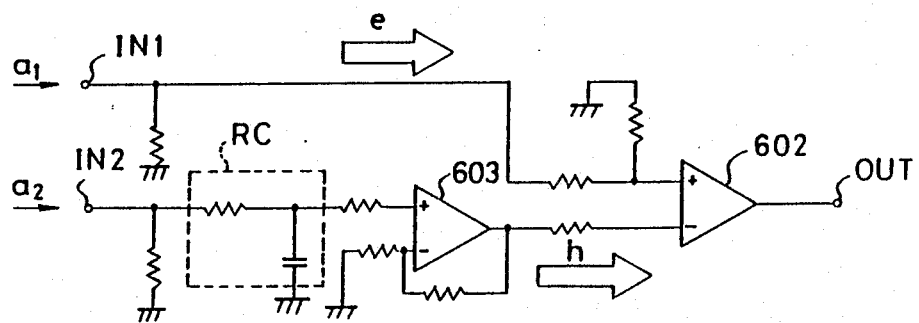

Referring to FIG. 6(B), the signal a₂ from the threshold device 300a₂ is passed through the integration circuit RC before it is amplifier by the amplifier 603. As a result, the waveform of the signal b₂ is expanded as illustrated in FIG. 7(C). This expanded signal is amplified by the amplifier 603 and is supplied to the inverting input terminal of the differential amplifier 602 similarly to the case of FIG. 6(A).

In such an image processing system, when there is a movement of body which causes detection of the edge such that the threshold detection device 300a₁ detects the edge first and then the threshold detection device 300a₂ detects the edge after a time t, the threshold detection device 600a produces output signal for a time interval of t. Thereafter, the inhibitory signal in the path h arrives at the device 600a and the output of the device 600a is prohibited. On the other hand, when the body is moving in the reversed direction such that the threshold detection device 300a₂ first detects the edge of the image and then the threshold detection device 300a₁ detects the edge after a time t, the threshold detection device 600a does not produce output signal at all. In this case, the inhibitory signal from the device 300a₂ first arrives at the threshold detection device 600a and output of the device 600a responsive to the excitement signal arriving later is suppressed. Thus, the system thus arranged detects the movement of body in only one direction. Output signal of the threshold detection device 600a is then supplied to another threshold detection device 700a forming an output part 700 of the system. The threshold device 700a is supplied with the output signal from a number of movement detection devices 600a arranged to detect the movement in a same direction and produces an output signal indicating the direction of movement of the body when a sum of the output signals form the devices 600a has exceeded a predetermined threshold. As a result, the detection of the moving body and the discrimination of the direction of movement can be performed reliably. The device 700a may be a simple comparator and the description thereof will be omitted.

Next, a third embodiment of the image processing system of the present invention directed to the solution of the aforementioned problem (b) of the first embodiment will be described with reference to FIGS. 8(A)-(C). In the drawings, these parts constructed identically to those corresponding parts in the preceding drawings are given identical reference numerals and the description thereof will be omitted.

Referring to FIG. 8(A), the system of this embodiment uses a differential circuit 605 in the signal path e for the excitement signal. Similarly to the case of FIG. 7(B), FIG. 8(B) shows only the essential part of FIG. 8(A). In this embodiment, the excitation signal b₁ produced by the device 300a₁ responsive to the image a₁ and passing through the path e is differentiated while the inhibitory signal b₂ in the path h is transmitted to the cell with the transient characteristic pertinent to the path h. Thus, when the edge of the image of a stationary body is detected by the threshold detection device 300a₁ while the device 300a₂ is not detecting the edge image, there is no output signal supplied to the device 600a through the path e and the false detection of the movement of the body as in the case of the first embodiment does not occur. When the body is moved, the excitement signal b₁ in the path e is changed and the differential circuit 605 supplies an output signal b₁' corresponding to the differential of the excitement signal to the device 600a. Thus, the movement of the body is detected similarly to the case of the first embodiment. Other operation is identical to the case of the first embodiment and the description thereof will be omitted.

FIGS. 9(A)-(C) show a fourth embodiment of the image processing system of the present invention in which the delay circuit 604 in the second embodiment and the differential circuit 605 in the third embodiment are combined. Similarly to the previous embodiments, FIG. 9(A) shows the overall construction of the system and FIG. 9(B) shows the essential part of FIG. 9(A). In the drawings, these parts constructed identically to those corresponding parts in the preceding drawings are given identical reference numerals and the description thereof will be omitted. As the construction of each of the signal paths e and h is identical to those already described, the description for the construction of the system will be omitted.

FIG. 9(C) shows the time response characteristic of the system of this embodiment. In this embodiment, the differential excitement signal b₁' is supplied to the device 600a responsive to the edge signal a₁ when the edge of the body is moved from the group of photodetectors cooperating with the threshold detection device 300a₁ to another group of photodetectors cooperating with the device $300a_2$. Responsive thereto, the threshold detection device 600a produces a detection signal indicating the detection of the movement. When the movement of the body is in the reversed direction, the inhibitory signal $b_2$ first arrives at the device 600a and the output of the device 600a is prohibited. Thus, the image processing system of this embodiment detects the direction of movement of the body without erroneous detection of movement of the body.

Next, an embodiment of the image processing system of the present invention for detecting slope of line will be described. This embodiment is intended to simulate the function of detecting slope of line in animals in which it is said that they have numerous cells responding to various slopes and recognition of complex line is performed by combining a number of such detected slopes. In the drawings, these parts constructed identically to those corresponding parts in the preceding drawings are given identical reference numerals and the description thereof will be omitted.

Figure 10:
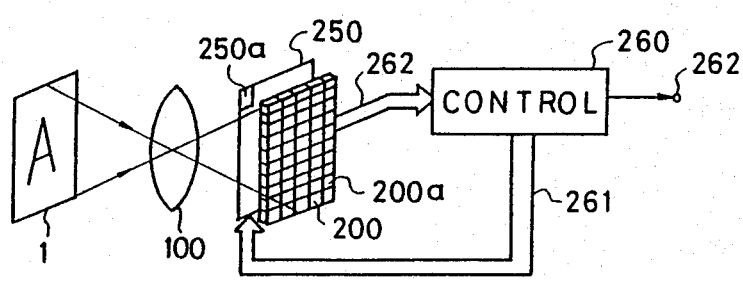
FIG. 10 shows another embodiment of the parallel image processing system of the present invention for detecting slope of an input image.

Referring to FIG. 10, an input image 1 such as a letter A is focused on a mask or shutter array 250 between the lens 100 and the photodetector cell array 200. In the cell array 200, each of the photodetector cells 200a operates independently. The shutter array 250 comprises a plurality of liquid crystal shutter subarrays 250a each corresponding to one of the photodetector cells 200a in the array 200.

Figure 11:
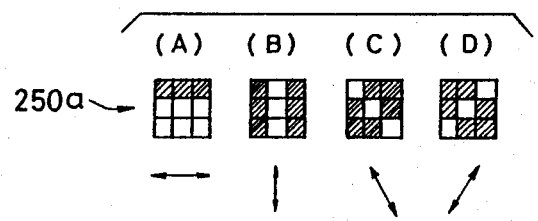
FIGS. 11(A)-(D) are diagrams showing various states of a shutter used in the system of FIG. 10.

FIG. 11 shows an example of the liquid crystal shutter subarray 250a corresponding to one photodetector cell 200a. Referring to the drawing, the shutter subarray 250a comprises nine independent liquid crystal shutter elements arranged in a 3×3 row and column formation. Each of the shutter elements are operated by a controller 260 via a bus 261 such that the state of the liquid crystal shutter subarray 250a is changed sequentially in time as (a)→(b)→(c)→(d) as shown in FIGS. 11(A)-(D). In FIGS. 11(A)-(D), it should be noted that the liquid crystal shutter element that is closed is represented by a slashed region. Such a change in the state of the shutter subarray 250a is made easily by applying electrical voltage selectively to the liquid crystal elements in the subarray 250a to be closed or to be opened from the controller 260. In each of the states, the line image having a slope shown below the drawing is passed through the subarray 250a preferentially. Responsive thereto, the photodetector cell 200a produces an output signal which is fed to the controller 260 via a bus 262. On the basis of this output signal in combination with the control signal sent to the shutter subarray 250a via the bus 261, the controller 260 recognizes the state of the shutter subarray 250a that has produced the maximum output signal of the photodetector cell 200a and responsive thereto, produces an output signal indicating the slope of the line image.

Figure 12:
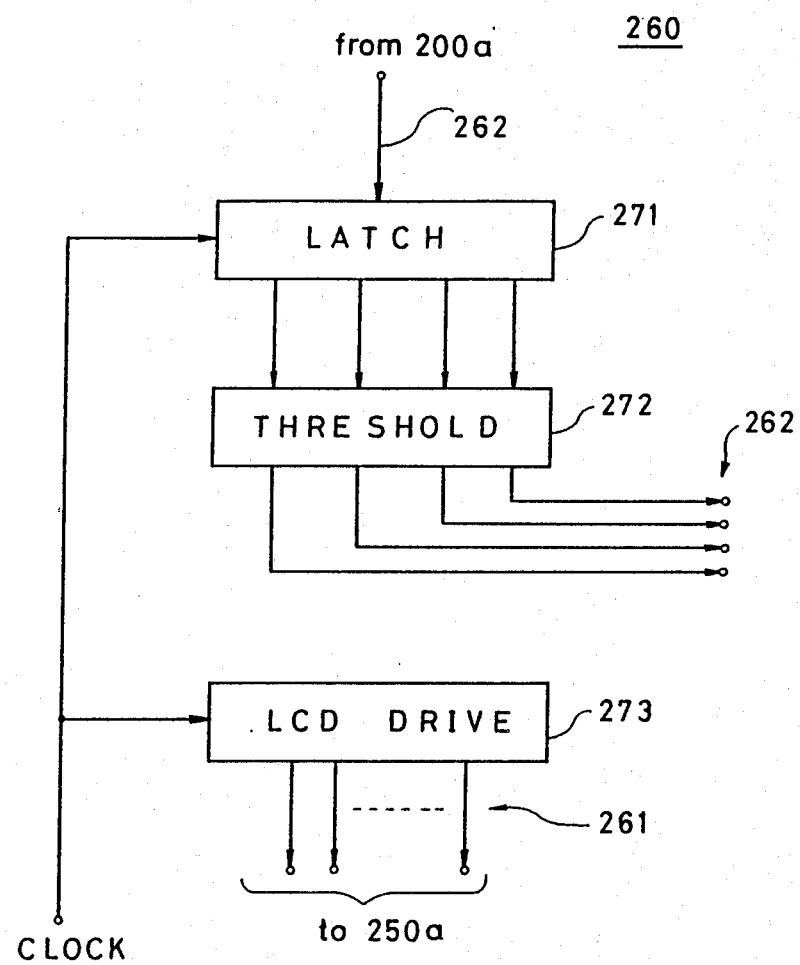
FIG. 12 is a block diagram showing a controller used in the system of FIG. 10.

FIG. 12 shows a more detailed construction of the controller 260. Referring to the drawing, the output of the photodetector cell 200a is sequentially latched up by a latch circuit 271 driven by an external clock pulse. In each cycle of the clock pulse including four clock pulses, the latch circuit 271 stores the output signal of the photodetector cell 200a in correspondence to the four different states of the shutter subarray 250a. After each cycle of the clock pulse, the output signals stored in the latch circuit 271 is read out in a form of four parallel output signals corresponding to four states of the shutter subarray 250a. These four parallel output signals are supplied to a threshold circuit 272 whereby only the output signal having a level exceeding a predetermined threshold is assigned a binary value 1. The other signals are given the binary value 0. The threshold circuit 272 then produces an output signal in a form of four bit signal indicating the slope by the position of the digit 1. At the same time, an LCD drive circuit 273 driven responsive to the external clock produces the control signal for controlling the operation of the shutter subarray 250a and this control signal is supplied to the shutter subarray 250a via the bus 261.

Figure 13:
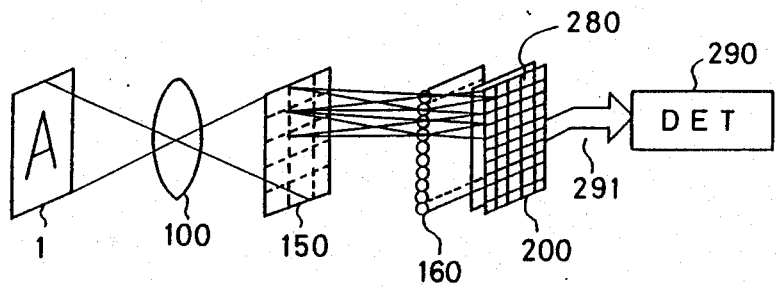
FIG. 13 is a diagram showing another embodiment of the parallel image processing system of the present invention for detecting slope of the input image.

FIG. 13 shows another embodiment for detecting the slope of line image using mask which does not change in time. In the drawing, these parts constructed identically to those corresponding parts in FIG. 10 will be given identical reference numerals and the description thereof will be omitted.

Referring to the drawing, the input image 1 is focused on a focusing plate 150 once, and the light passed through the focusing plate 150 is focused on the photodetector cell array 200 by a lens array 160 after passing through a mask plate 280 positioned between the lens array 160 and the photodetector array 200.

Figure 14:
FIG. 14 is a diagram showing a mask used in the system of FIG. 13.

In this embodiment, the photodetector cells 200a in the array 200 are grouped into a plurality of photodetector sets each comprising for example four cells arranged in a row and column formation. In correspondence to each of the photodetector sets in the array 200, the mask 280 is divided into a plurality of unit regions and each of the unit regions is further divided into four mask patterns arranged in a row and column formation in correspondence to the four photodetector cells in the photodetector set. FIG. 14 shows an example of such mask 280 in which there are twelve unit regions arranged in a 4×3 formation. It can be seen that each of the unit region is divided into four parts carrying four different patterns.

Figure 15:
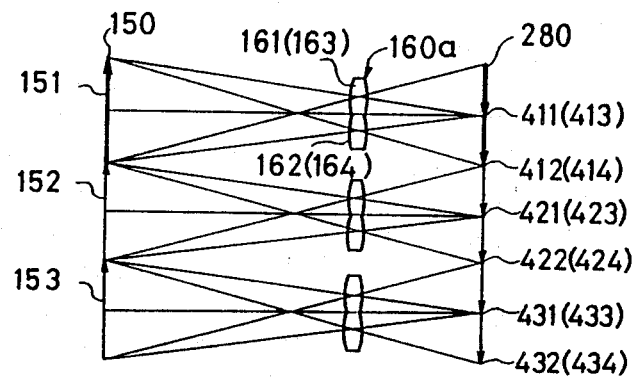
FIG. 15 is a diagram showing an optical system used in the system of FIG. 13.
Figure 16:
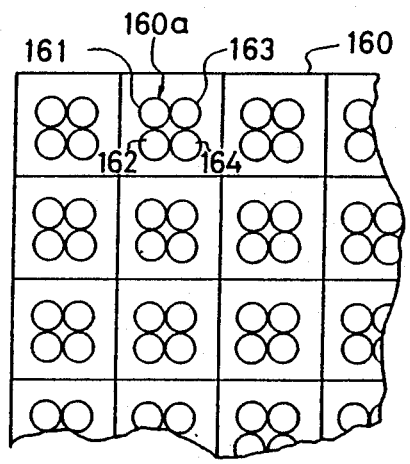
FIG. 16 is a plan view showing the optical system of FIG. 15.

In order to focus the image 1 once focused on the focusing plate 150 again on the photodetector array 200 through the mask 280, the lens array 160 is constructed by a plurality of lenses which are grouped into a plurality of lens sets 160a each containing four lenses arranged in a row and column formation in correspondence to the four photodetector cells 200a in the photodetector set (FIG. 15). One of the lenses in the lens set 160a focuses a part of the image in the focusing plate 150 on the mask 280 immediately in front of the photodetector array 200. Thus, a lens 161 in FIG. 15 focuses an image part 151 of the image 1 in the focusing plate 150 on the mask 280 as an image 411. Similarly, a lens 162 focuses the same image part 151 on the mask 280 as an image 412. As there are also provided lenses 163 and 164 as can be seen in FIG. 16 which is a plan view of the lens array 160, there are also images 413 and 414 in correspondence to the image part 151.

Each of the images 411-414 corresponding to the same image 151 is passed through the mask 280 according to respective mask patterns corresponding to different slopes of line and are detected by the photodetector cells 200a forming the photodetector sets in the array 200. Thus, the photodetector cell 200a in the set detecting the image passed through the mask pattern which matches with the slope of the line image, produces the strongest output signal. These output signals of the photodetector cells are supplied to a slope detecting circuit 290 via a bus 291 and the circuit 290 determines the slope of the line image.

Figure 17:
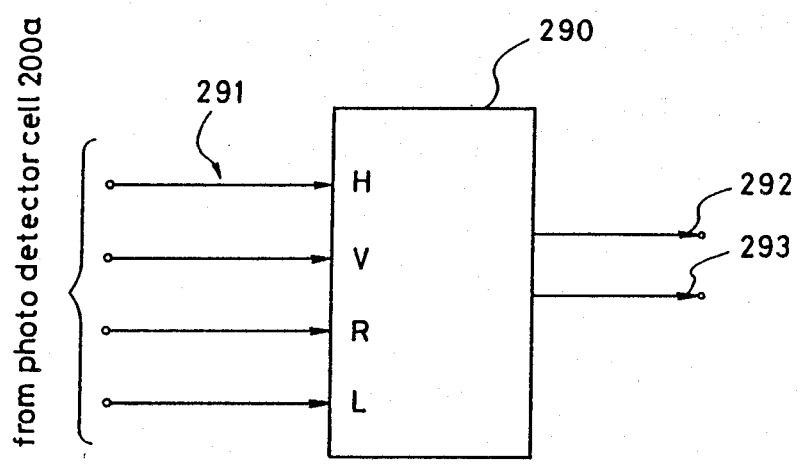
FIG. 17 is a block diagram showing a slope detecting circuit used in the system of FIG. 13.

FIG. 17 shows an example of construction of the slope detecting circuit 290. Referring to the drawing, the output signals from the four photodetector cells 200a forming the photodetector set are supplied to an input port H, V, R and L of the circuit 290 via the bus 291 in which the input port H corresponds to the photodetector cell 200a which detects a horizontal line through the mask 280, the input port V corresponds to the photodetector cell 200a which detects a vertical line through the mask 280, the input port R corresponds to the photodetector cell 200a which detects an oblique line extending from upper right to lower left direction, and the input port L corresponds to the photodetector cell 200a which detects an oblique line extending from upper left to lower right direction. Responsive to these input signals, the slope detecting circuit 290 compares the level of these signals and supplies an output signal indicating the level of the strongest input signal supplied along the bus 291 to an output terminal 292 together with another output signal indicating the port to which the strongest input signal is supplied. This second output signal is supplied to another output terminal 293 and indicates the slope of the input image 1.

Figure 18:
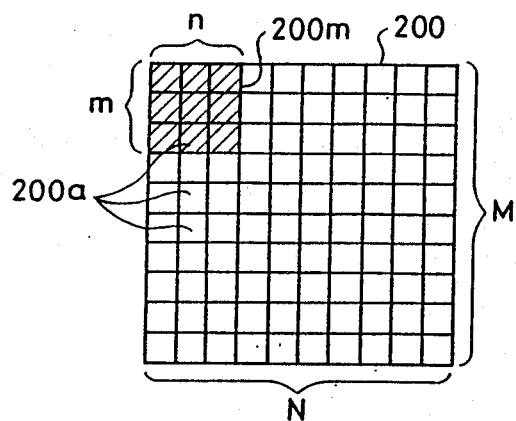
FIG. 18 is a diagram showing a subdivision of photodetector cell array used in another embodiment of the parallel image processing system of the present invention.
Figure 19:
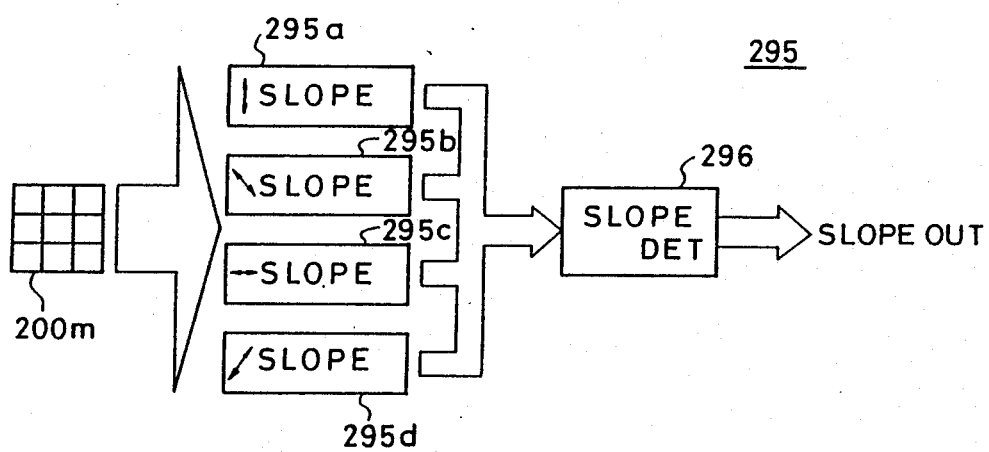
FIG. 19 is a block diagram showing the parallel image processing system for detecting slope of the input image.
Figure 20:
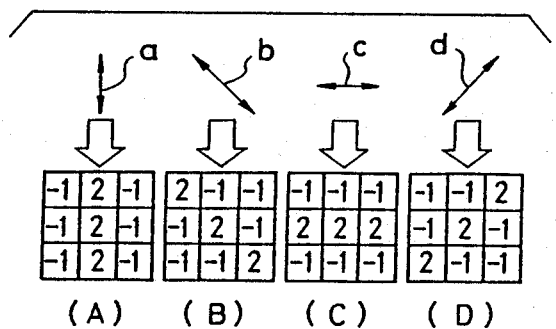
FIGS. 20(A)-(D) are diagrams showing weighting of signals in various signal channels in the system of FIG. 19.

Next, another embodiment for detecting the slope of the line image will be described with reference to FIGS. 18–21. In the drawing, these parts constructed identically to those corresponding parts in the preceding drawings are given identical reference numerals and the description thereof will be omitted. In this embodiment, the mask 250 or 280 used in the embodiment of FIG. 10 or FIG. 13 is eliminated and the photodetector cell array 200 is divided into a plurality of sets or subarrays 200m comprising m X n arrays of photodetector cells 200a as illustrated in FIG. 18. The output signals of these photodetector cells 200a in the subarray 200m are supplied to a slope detecting part 295 shown in FIG. 19 wherein the signal path carrying the output signals is divided into four signal paths 295a, 295b, 295c and 295d as illustrated in FIG. 19. In each of the signal paths 295a–295d, the output signals are applied with respective weights as illustrated in FIG. 20. Thus, the signal path 295a applies a weight "2" to the output signals from the cells 200a aligned vertically at the center of the subarray 200m and a weight "−1" to the output signals from other cells in the subarray 200m (FIG. 20(A)). Similarly, the signal path 295b applies the weight "2" to the output signals from the cells 200a aligned on a diagonal line extending from the upper left corner to the lower right corner and the weight "−1" to the other cells as shown in FIG. 20(B). Further, the the signal path 295c applies the weight "2" to the output signals from the cells 200a aligned horizontally at the center of the subarray 200m and the weight "−1" to the output signals to the other cells as shown in FIG. 20(C). Furthermore, the signal path 295d applies the weight "2" to the output signals from the cells 200a aligned diagonally from the upper right to the lower left corner of the subarray 200m and the weight "−1" to the other cells as shown in FIG. 20(D).

Figure 21:
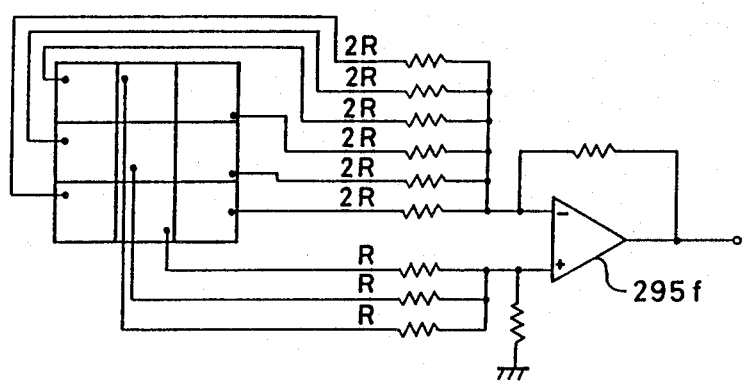
FIG. 21 is a circuit diagram showing an actual circuit of the signal channels shown in FIG. 19.

FIG. 21 is an actual circuit diagram for the signal path 295a. Referring to the drawing, the output signals of the photodetector cells 200a aligned vertically at the center of the 3×3 subarray 200m are supplied to the non-inverting input terminal of a differential amplifier 295f through a resistor having a resistance R and the output signals of the other photodetector cells are supplied to the inverting input terminal of the amplifier 295f through a resistor having a resistance 2R. Responsive thereto, the differential amplifier 295f produces an output positive signal when the level of the signal supplied to the non-inverting input terminal of the amplifier 295f exceeds the level of the signal supplied to the inverting input terminal. In other words, the differential amplifier 295f produces output negative signal only when a vertical line image is focused on the photodetector cell array 200. A similar circuit is also provided in the signal paths 295b–295d. Thus, there are four output signals respectively indicating the detection of line image having the slope corresponding to those shown in FIGS. 20(A)-(D). These four output signals are supplied to a slope detection circuit 296 which may be a circuit similar to the one shown in FIG. 17 as the slope detection circuit 290. Thus, the slope detection circuit 296 compares the four input signals and produces an output signal indicating the slope of the input image 1.

Figure 22:
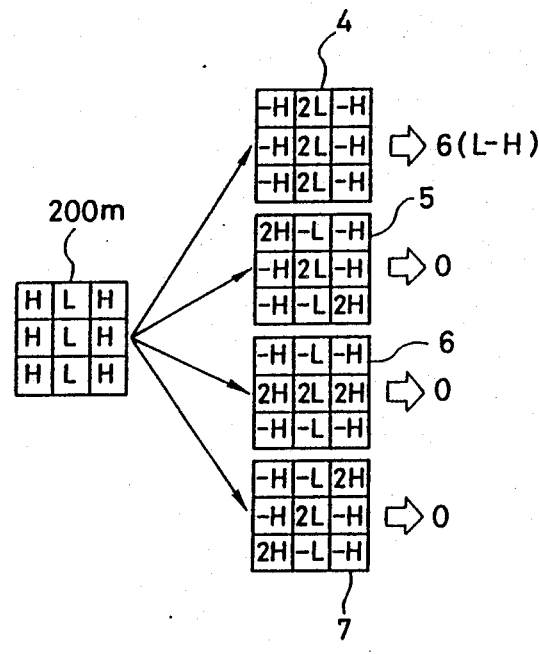
FIG. 22 is a diagram for explaining the actual weighting of the signals in the system of FIG. 19.

FIG. 22 shows an example of detection of the vertical line which is already described briefly. In this drawing, the output of the photodetector cells 200 which have detected the line image assumes a level L and those cells which failed to detect the image assumes a level H. When the output signals of these nine cells are supplied to the four signal paths 295a–295d, the output signal of the cells are applied with the weight "2" and the weight "−1" as illustrated in a form of tables 4–7 in FIG. 22. Thus, the sum of the output signals of the cells 200a in the subarray 200m assumes a value of 6(L-H) for the channel 295a while the sum of the output signals for other channels becomes zero. This non-zero output of the channel 295a is then detected by the slope detecting circuit 296 as already described.

Further, the present invention is not limited to these embodiments but various variations and modifications may be made without departing from the scope of the invention.

What is claimed is:

1. A parallel image processing system comprising:
   an image detection array comprising a two-dimensional array of a number of photodetector elements for detecting an input image;
   edge detection means comprising a number of edge detection elements each being supplied with output signals from a plurality of photodetector elements with respective weights for producing an output signal indicating detection of edge of the input image as a function of a sum of said plurality of output signals applied with said weights; and
   movement detection means comprising a number of movement detection elements each being supplied with output signals from a first group of the edge detection elements each in turn corresponding to said plurality of photodetector elements forming a first photodetector group, along a first signal path as an excitement signal, and further from a second group of the edge detection elements each in turn corresponding to said plurality of photodetector elements forming a second photodetector group aligned in row with said first photodetector group in the image detection array, along a second signal path as an inhibitory signal, for producing a movement detection signal indicating movement of the input image on the basis of comparison of the excitement signal and the inhibitory signal.

2. A parallel image processing system as claimed in claim 1 in which said function is chosen such that the edge detection elements produces the edge detection signal when the plurality of photodetector elements supplying the output signals to the edge detection element has failed to detect a uniform input image.

3. A parallel image processing system as claimed in claim 1 in which said movement detection elements is supplied with the output signals from two edge detection elements, one corresponding to the first group of the edge detection elements and the other corresponding to the second group of the edge detection elements.

4. A parallel image processing system as claimed in claim 1 in which said movement detection element produces the movement detection signal when it is supplied with only one of the excitement signal and the inhibitory signal.

5. A parallel image processing system as claimed in claim 4 in which said movement detection element produces the movement detection signal only when there is the excitement signal in the first signal path.

6. A parallel image processing system as claimed in claim 5 in which said movement detection comprises a comparator for producing an output signal only when the excitement signal in the first signal path has a level exceeding that of the inhibitory signal in the second signal path.

7. A parallel image processing system as claimed in claim 1 in which said movement detection means comprises delay means in either one of said first and second signal paths.

8. A parallel image processing system as claimed in claim 7 in which said delay means is provided in the second signal path.

9. A parallel image processing system as claimed in claim 7 in which said delay means comprises an integral circuit.

10. A parallel image processing system as claimed in claim 1 in which said movement detection means comprises a differential means in either one of the first and second signal paths.

11. A parallel image processing system as claimed in claim 10 in which said differential means is provided in the first signal path for differentiating the excitement signal.

12. A parallel image processing system comprising:

a lens for focusing a light beam carrying a two-dimensional input image, said input image being defined with respect to a first coordinate defining a first direction and with respect to a second coordinate defining a second direction, the second direction being different from the first direction;

an image detection array comprising a two-dimensional array of a number of photodetector elements to be irradiated by the light beam, for detecting the input image responsive to the irradiation by the light beam, the photodetector elements being arranged in the first direction and in the second direction to form the two-dimensional array;

weighting means for receiving signals from a plurality of photodetector elements forming a subarray in the image detection array, for applying a predetermined weight to each of the signals supplied thereto from the photodetector elements so as to form weighted signals, and further for obtaining a sum of the weighted signals thus formed as a sum signal, said weighting means being divided into a plurality of channels, each channel applying the weights pertinent to the channel and producing the sum signal pertinent to the channel, said weighting means applying, in each of the channels, the predetermined weight such that the signals from a group of photodetector elements of the subarray arranged in correspondence to a predetermined slope of the two dimensional image are given a greater weight than signals from other photodetector elements of the subarray, said predetermined slopes corresponding to respective channels, said predetermined weights pertinent to the channels being changed depending on the channels; and slope detecting means, receiving the sum signals from each of the channels of the weighting means, for producing a slope detection signal indicating the slope of the input image with respect to the first and second directions on the basis of comparison of the sum signals.

* * * * *

UNITED STATES PATENT AND TRADEMARK OFFICE
CERTIFICATE OF CORRECTION

PATENT NO. : 4,985,618

DATED : January 15, 1991

INVENTOR(S) : Inada et al

It is certified that error appears in the above-identified patent and that said Letters Patent is hereby corrected as shown below:

On the title page:
Under the section [73] Assignee:, delete "Nicoh Company, Ltd., Japan" and insert --Ricoh Company, Ltd., Japan--

Signed and Sealed this

Third Day of September, 1991

Attest:

HARRY F. MANBECK, JR.

*Attesting Officer*  *Commissioner of Patents and Trademarks*